Figures 1, 2:
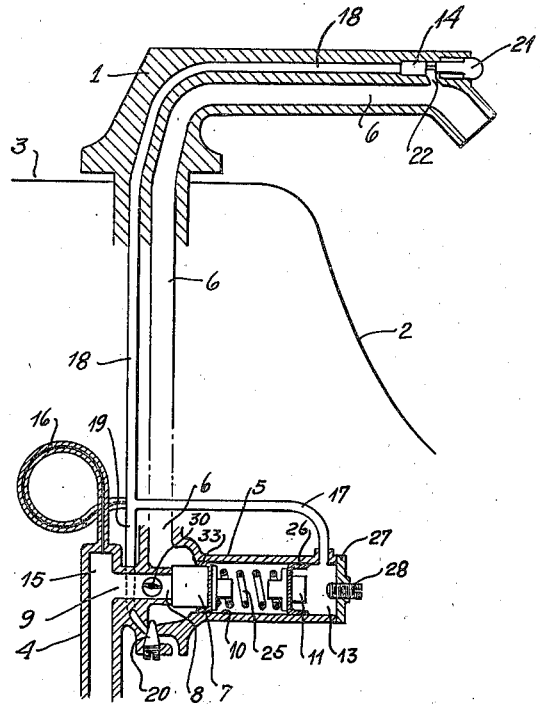

March 1, 1938.　　W. H. FINLEY ET AL　　2,109,958
FAUCET APPARATUS
Filed Nov. 13, 1935　　2 Sheets-Sheet 1

INVENTORS.
Walter H. Finley
BY Charles H. Hamilton
Bates Goldrick & Teare
ATTORNEYS March 1, 1938. W. H. FINLEY ET AL 2,109,958
FAUCET APPARATUS
Filed Nov. 13, 1935 2 Sheets-Sheet 2
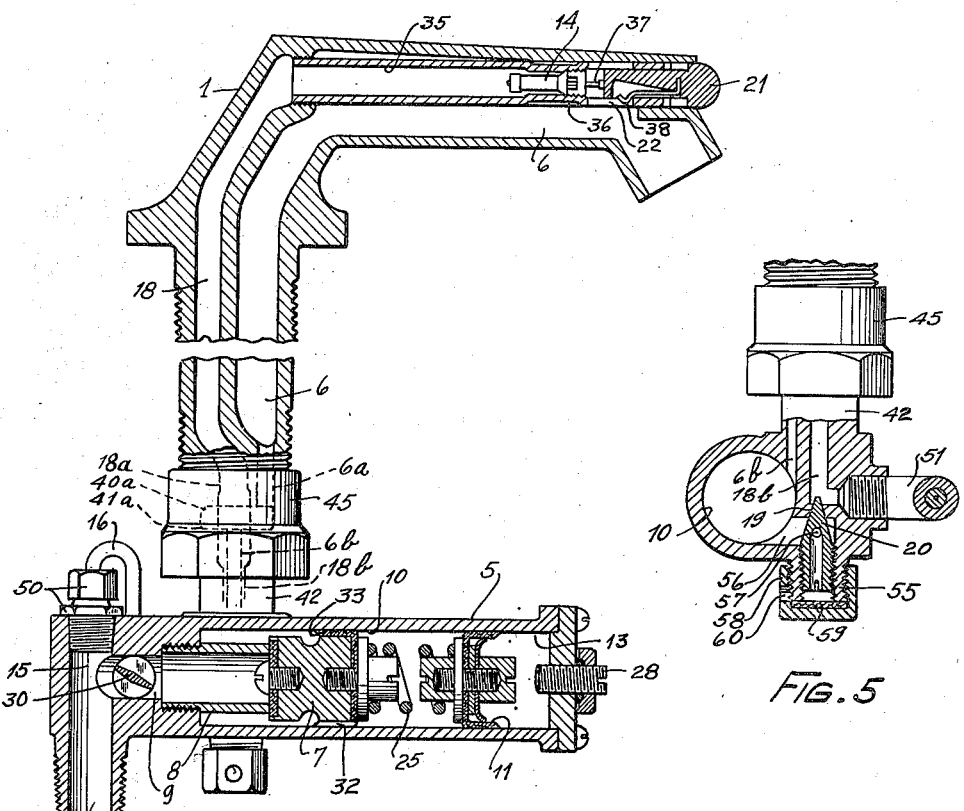
FIG.3
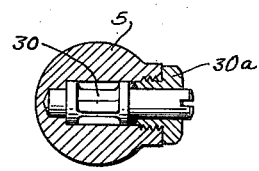
FIG.5
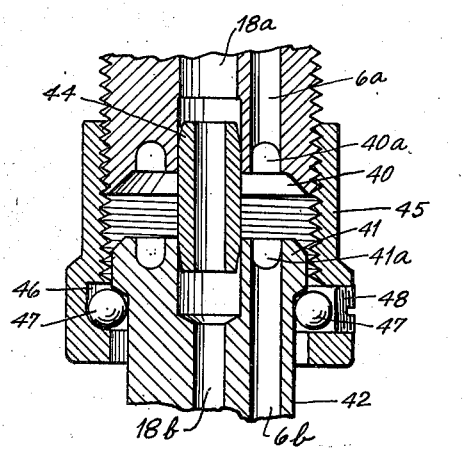
FIG.4
FIG.6
INVENTORS.
Walter H. Finley
BY Charles H. Hamilton
Bates, Golrick & Tease
ATTORNEYS.

Patented Mar. 1, 1938

2,109,958

UNITED STATES PATENT OFFICE 2,109,958

FAUCET APPARATUS

Walter H. Finley and Charles H. Hamilton, Nashville, Tenn.

Application November 13, 1935, Serial No. 49,528

4 Claims. (Cl. 137—139)

The principal object of this invention is to provide an improved liquid discharge device or apparatus; one which, upon actuation, will operate for a predetermined period and then automatically stop.

Other objects include the provision of a "period" faucet which will meet all sanitation standards, will be simple to construct and install, positive and efficient in operation, adapted to various types of lavatory bowl, etc. installations, which will be extremely easy to operate, and which may be adjusted to deliver fluid in the desired volumes and for the desired periods. Various other objects and advantages will become apparent from the following description relating to the accompanying drawings, showing a preferred form.

In the drawings, Fig. 1 is a mechanical diagram illustrating the operative relationship of the principal elements; Fig. 2 is a plan view of the valve apparatus illustrating certain details of the preferred coupling between the faucet proper and the valve body, and showing the high pressure tubing and connections which are preferably outside the main valve body; Fig. 3 is an assembly longitudinal sectional view showing the apparatus of Fig. 1 designed for practical production and installation; Fig. 4 is a detail longitudinal sectional view of the coupling mentioned above (re Fig. 2) the coupling parts being relatively separated, and Figs. 5 and 6 are transverse sectional views, as conventionally indicated on Fig. 2, showing other details of construction.

Largely for hygienic reasons, people commonly object to drawing water into a lavatory bowl and washing from the bowl, and instead open the faucet or tap and wash from the running water. Consequently, most lavatory systems that are accessible to the public generally or in large numbers, are equipped with faucets which close immediately upon release of the operating handle, thereby preventing one from absentmindedly leaving the water running. Thus, one using such equipment has the choice of partially filling the bowl and washing therein or of practically washing with one hand; the other being occupied most of the time in keeping the water running. The present invention has been developed partly with the view to making lavatory operations more convenient while nevertheless preventing one, using a lavatory, from leaving the faucet open indefinitely. Other desiderata have to do with sanitation, economy of construction and adaptability to existing water systems, as will later be shown.

In the particular form herein shown, use is made of the valve mechanism principles demonstrated in our copending application Serial No. 714,490, filed March 7th, 1934, and now Patent No. 2,064,343, granted Dec. 15, 1936. This application is in part for an improvement on a special adaptation of the valve mechanism disclosed and claimed in that case.

Referring first to Fig. 1, this, as stated above, is essentially a diagram and while the essential parts could be constructed about as therein shown, the preferred design is shown only in the other figures.

In Fig. 1, the faucet body is indicated at 1, the lavatory bowl at 2, (this having the usual slab or ledge portion 3), the main supply inlet for water at 4, the main valve body at 5, and the general water passage leading from the main valve to and through the faucet to the discharge spout at 6. The water is supplied to the passage 6 whenever a main valve plug 7 in the body withdraws from the valve port 8, the latter being part of a lateral branch passage 9, leading from the main inlet 4.

The valve plug is slidable in a suitable guide bore 10 in the body 5, and is normally held in sealing relation to the port 8 by hydrostatic pressure applied against a piston or plunger 11 operatively connected with the plug and which is in slidably sealed relation to a cylinder 13 in the body.

The pressure chamber formed by the cylinder is rendered active, as shown, by fluid supplied from the line 4 through a special conduit system, so arranged that the user of the faucet may release the working pressure in the cylinder 13 by means of a pilot valve 14 located either on the faucet, or in a position accessible to the person using it, so as to permit or cause the valve 7—8 to open or be opened. It should be noted that the effective diameter of the piston 11 is greater than the sealing area of the valve plug, wherefore, if water is supplied to the pressure chamber 13 at supply line pressure, the valve will automatically be held closed.

The conduit system comprises an inertia chamber 15 formed, as shown, by a pocket-like portion of the supply line extending past the branch 9 which leads to the valve port, a friction or capillary passage or tube 16 (having a constant very small inside diameter, say 1/64"), and two branch tubes or passages 17 and 18 of substantially larger bore, leading respectively from the terminus of the tube or passage 16 to the pressure chamber 13 and the pilot valve 14. The importance of the inertia chamber 15 is that thereby a substantial hydrostatic head is constantly maintained in communication with the inlet end of the friction tube or passage 16 when the valve 7—8 opens and hydrostatic head in the vicinity of the port 8 is converted into velocity head, and the supply line pressure drops in said vicinity. Thus, there is no variable delay factor introduced in re-establishing operating pressure in the chamber 13 after each actuation of the valve.

The conduit system 16, etc. also includes a passage 19, which leads to a suitable plug or cock designated 20 for frost drainage purposes, as will later be described.

The pilot valve 14 may be, and preferably is, a standard automobile tire valve (Dill valve e. g.) having a discharge capacity greater than that of the friction tube or passage 16, and this pilot may be controlled by a suitable push button 21 on the faucet so as to dump part of the contents of the relatively larger passage 18 into the faucet discharge duct 6 through a small lateral passage 22. Since the passages 18 and 17 are in open communication with the pressure chamber, and both are materially larger than the pressure supply passage 16, the operating pressure in the chamber 13 immediately falls and the main valve 7—8 opens, even though the pilot valve is opened but for a moment. This condition obtains for some little time because the small passage 16 requires time to again establish operating pressure in the chamber 13, sufficient to close the main valve.

The movement of the piston is communicated to the valve plug by yielding means comprising, as shown, a compression spring 25 interposed between the piston and plug. The piston has a cup-leather or equivalent efficient packing 26 and the primary purpose of the spring is to store the energy imparted to it when equilibrium of pressure is established between the supply line 4 and the compression chamber 13, so that between operations of the faucet, should the packing 26 become "frozen" in its cylinder by static friction, the spring will add its stored energy to that of the supply line pressure against the plug 7 and insure the outward movement of the piston, toward its cylinder head, notwithstanding such static friction.

Another function of the yielding connection 25 is that, as supply line pressure fluctuates, the piston moves slightly back and forth, but without permitting the valve 7—8 to open, thereby normally preventing the establishment of sufficient static friction to cause freezing. An unvarying supply line pressure is an abnormal condition.

The period during which the valve stays open upon actuation of the apparatus, as described, may be easily determined and controlled for initial adjustment by varying the length of the friction tubing, which is used, in the preferred form, to embody the friction passage 16. The tube is coiled, as indicated, to provide the necessary tube length in a compact arrangement. For variation of the operating period after installation, the piston travel may be adjustably limited as by an adjusting screw 28, in suitable packing in the cylinder head 27 arranged to engage the piston to limit its outward travel. Obviously, the less water is discharged from the pressure chamber upon release of the pilot, the less time will be required to fill it and thereby close the main valve.

Volume of discharge through the valve 7—8 may be increased or decreased by a suitable valve in the inlet passage 9. As shown, there is a butterfly type of valve 30 adapted to variably restrict the passage so as to adjust it initially to such a point that the water discharged from the faucet will not be too copious or too limited.

By way of providing a suitable guide for the valve in the cylinder 10, which forms the valve chamber, a cup-leather type of device 32 is mounted on the plug in a manner which will be obvious from inspection. In order that this cup leather will not act as a seal and dampen the free operation of the spring, kerfs may be formed in the skirt of the device 32 as indicated at 33, to allow water to freely pass the plug.

The frost drain, as shown in the diagram, comprises a tapered screw plug which normally closes both the drain line or passage 19 and the sump of the valve, but which, for example, upon closing a dwelling house for the winter, may be withdrawn to permit substantially all parts of the system to drain freely.

The reference characters used in the above description are applied to the corresponding parts of the apparatus and system and the refinements deemed necessary for practical production will now be described in connection with Figs. 2 to 6.

Referring first to Fig. 3, the faucet body, as shown, has practically all of the discharge passage 6 cored therein, as will be obvious from inspection. The lower part of the passage (in the vertical stem or spud of the body) may be formed by one or more drilled openings 6a lying outwardly from the center of the stem. The high pressure passage 18 lies centrally of the stem at its lower end; see 18a.

The passage 18 in the faucet body may be completed by a sleeve 35 suitably sealed at its inner end into an appropriate horizontal bore in the casting and this, as shown, has a restriction at 36' to adapt it for threading to receive the pilot (Dill e. g.) valve body threads and lying outwardly from the restriction the sleeve has one or more lateral passages (cf. 22 Fig. 1) to vent the "weep" of the valve, when opened, into the main faucet passage 6.

The push button 21 may be Bakelite and has its inner end arranged to abut the operating stem 37 of the pilot valve. The button also has a spring detent or keeper 38 embedded therein adapted to engage one of the lateral passages 22 of the sleeve as a keeper. This is accessible for release through the spout of the faucet, as will be easily seen.

Referring now to the coupling between the stem or spud of the faucet body and the main valve body, it will be noted that the lower end of the stem is conically recessed at 40 to fit a conical head 41 on the vertical extension 42 of the valve body 5. Also the two parts just mentioned have annular channels 40a and 41a which match in position when the conical surfaces are put together (cf. Figs. 3 and 4). A suitable number of drilled e. g. passages 6b in the extension 42 communicate the annular channel thereof, with the valve chamber around the port 8.

The central high pressure passages 18a and 18b of the stem and extension 42 are enlarged near the termini of these parts for receiving between them a compression coupling sleeve 44 to establish the necessary effective seal between these two passages when the stem and extension are brought together to make the low pressure connection (at 40, 41) between the parts of the discharge passage 6. A union nut 45 is threaded to the stem of the faucet and has an annular channel 46 adapted to receive a series of bronze balls 47 which form the necessary upward abutment with the under surface of the head 41. The balls may be inserted into the channel through a lateral passage in the nut, shown as closed to retain the balls by a threaded plug 48. The anti-friction bearing provided by the balls in the channel makes the tightening operation very easy, notwithstanding having to somewhat compress the coupling sleeve 44 to establish the high pressure connection between 18a and 18b.

It will be obvious that the above coupling permits the valve body 5 to be located in any turned position (as may be required by varying installation conditions) with respect to the faucet and that both the low and high pressure connections to establish the passages 6 and 18 are effected as one operation.

Referring to the friction tube 16, it will be seen that the inertia chamber 15, from which this leads, is actually formed in a compression coupling 50 and that the other end of it (beyond the portion that is coiled for disposing of its length) enters a standard T 51 provided with standard compression couplings for the tubes 16 and 17. The manner in which the threaded stem of the T communicates with the passage 18b is clear from Fig. 5. An extension 53 of the body connects the outer end of the tube 17 with the compression chamber 13 through a suitable compression coupling.

Fig. 6 shows the construction of the flow adjustment valve 30, and it will be noted that the valve may be adjusted as by a screw driver and locked by a packing sleeve 30a, adapted to be turned by a wrench.

The frost drain passages are clear from Fig. 5; the plug 20 being threaded into a depending spud 55 of the body casting the threaded opening in the spud communicating with the lateral sump 56 and also with a conical opening 19 (cf. passage 19 on Fig. 1) into which the upper tapered end of the plug seats tightly. The plug is hollow and has a lateral passage 57 leading to the sump. The plug may be operated by a screw driver and the spud 55 may be sealed as by a threaded cap 58 and washer 59. The cap has a lateral drain passage 60 so that the cap may be replaced loosely on the spud after unseating the plug 20 and insure full drainage. The frost drain provision would, of course, be omitted in installations for office buildings, public lavatories, etc.

Referring further to the main valve, it will be noted that, as shown in Fig. 3, the valve port 8 is formed by a sleeve separate from the body casting and that the plug, as there shown, embodies a plastic seat for efficient sealing. Other refinements of construction, particular reference being made to the valve operating mechanism, are obvious from inspection.

It will be seen that in addition to the various advantages above mentioned, the faucet may be operated by a very slight touch due principally to the fact that the pilot valve is so small. Use of such small valve is permitted by reason of the fact that the feed passage to the releasable pressure chamber 13 is so small (the friction tube 16 being indicated), wherefore the pressure will fall when the pilot valve is merely touched, notwithstanding the small discharge capacity of the pilot valve.

We claim:

1. In lavatory apparatus, a faucet comprising a spout body and a main water supply control valve body and valve therein, a hydraulically operated device in the latter body to normally hold the valve closed, said device including a pressure chamber, separate passages in the spout body for communicating the interior of the spout with the valve and pressure chamber respectively, cooperating passages in the valve body for continuing the spout passages to the valve and chamber, a pilot valve on the spout body for releasing pressure in the pressure chamber through one of the spout body passages, and a releasable connection between the spout and valve bodies arranged sealingly to connect the passages of the spout body with those of the valve body in various relatively turned positions of the two bodies.

2. In lavatory apparatus, a spout body above the lavatory bowl, said body having two passages leading thereinto, a valve body below the lavatory bowl, said valve body having a supply inlet, valve chamber and valve plug, the latter being arranged to close communication between the inlet and chamber, hydraulically operated means in the valve body for operating the valve, a fluid duct in the valve body connected with the said means for actuating said means, means sealingly to connect the valve body duct and valve chamber with respective said passages of the spout body, and a pilot valve in one of the spout body passages for manually controlling the hydraulically operated means.

3. In lavatory apparatus, a faucet spout body, a water supply line including a valve body, positioned below the spout body, and having a valve chamber therein communicable with the discharge passage of the spout, a hydraulically operable device in said valve body including a restricted fluid duct for conveying operating fluid from the supply line to said device, means to release the operating pressure of said device to admit water from said line to the spout discharge passage and a common means for draining said valve chamber and fluid duct.

4. In a fluid discharge device having a fluid control valve and a spout casting having a duct formed therein communicating with the valve to discharge fluid from the valve, a pressure differential operated device for actuating the valve, a passage formed in the casting and connected with said device in a manner to operate it when said passage is opened, and means to open said passage, carried by the casting and having a manually operable actuating part which is engageable by the hand of a user when positioned to receive the discharge of the spout from said duct.

WALTER H. FINLEY.
CHARLES H. HAMILTON.